US011683236B1

United States Patent
Cieslak et al.

(10) Patent No.: US 11,683,236 B1
(45) Date of Patent: *Jun. 20, 2023

(54) BENCHMARKING TO INFER CONFIGURATION OF SIMILAR DEVICES

(71) Applicant: Snap Inc., Santa Monica, CA (US)

(72) Inventors: Michael Cieslak, Los Angeles, CA (US); Jiayao Yu, Venice, CA (US); Kai Chen, Manhattan Beach, CA (US); Farnaz Azmoodeh, Venice, CA (US); Michael David Marr, Monroe, WA (US); Jun Huang, Beverly Hills, CA (US); Zahra Ferdowsi, Marina del Rey, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/382,365

(22) Filed: Apr. 12, 2019

Related U.S. Application Data

(60) Provisional application No. 62/827,014, filed on Mar. 30, 2019.

(51) Int. Cl.
*H04L 41/14* (2022.01)
*H04L 67/00* (2022.01)
*H04L 67/01* (2022.01)

(52) U.S. Cl.
CPC ............ *H04L 41/14* (2013.01); *H04L 67/34* (2013.01); *H04L 67/01* (2022.05)

(58) Field of Classification Search
CPC .......... H04L 41/14; H04L 67/34; H04L 67/42
See application file for complete search history.

(56) References Cited

U.S. PATENT DOCUMENTS

| 7,346,512 | B2 | 3/2008 | Li-Chun et al. |
|---|---|---|---|
| 8,224,308 | B1 | 7/2012 | Gavrylyako et al. |
| 8,584,114 | B2* | 11/2013 | Rabinovich .............. G06F 8/36 |
| | | | 717/171 |
| 10,242,193 | B1* | 3/2019 | Babun ..................... G06F 21/57 |
| 10,868,788 | B1 | 12/2020 | Underwood et al. |
| 11,240,104 | B1* | 2/2022 | Cieslak .............. H04L 41/0866 |
| 2002/0178241 | A1 | 11/2002 | Eriksson |
| 2003/0046189 | A1 | 3/2003 | Asayama |
| 2009/0119256 | A1 | 5/2009 | Waters et al. |
| 2010/0066983 | A1 | 3/2010 | Jun et al. |
| 2011/0173247 | A1* | 7/2011 | Hubbard ................ G06Q 10/06 |
| | | | 709/203 |

(Continued)

OTHER PUBLICATIONS

J.A. Mathew et al., "Analysis and Development of Java Grande Benchmarks," 1999, ACM, 72-80 (Year: 1999).

(Continued)

*Primary Examiner* — William G Trost, IV
*Assistant Examiner* — Abdelbasst Talioua
(74) *Attorney, Agent, or Firm* — Culhane Meadows PLLC; Stephen J. Weed

(57) ABSTRACT

Systems, devices, media, and methods are presented for categorizing unknown devices using benchmark applications. Benchmark applications are distributed to client devices to produce performance metrics for the client devices. Performance metrics of the client devices are used to categorize unknown devices by comparing the performance metrics of these devices to performance metrics of known devices.

18 Claims, 8 Drawing Sheets

(56) References Cited

U.S. PATENT DOCUMENTS

| | | | |
|---|---|---|---|
| 2013/0139263 A1* | 5/2013 | Beyah | H04L 63/1408 726/23 |
| 2013/0267255 A1* | 10/2013 | Liu | H04W 4/029 455/456.3 |
| 2015/0074656 A1* | 3/2015 | Eramian | G06F 9/44505 717/168 |
| 2015/0193651 A1* | 7/2015 | Gleim | G06K 9/00288 382/118 |
| 2016/0062867 A1 | 3/2016 | Rodriguez et al. | |
| 2016/0098561 A1 | 4/2016 | Keller et al. | |
| 2016/0173321 A1 | 6/2016 | Gukal et al. | |
| 2016/0283853 A1 | 9/2016 | Lee et al. | |
| 2016/0321594 A1 | 11/2016 | Linde et al. | |
| 2017/0118510 A1 | 4/2017 | Stathacopoulos et al. | |
| 2017/0206707 A1 | 7/2017 | Guay et al. | |
| 2017/0250879 A1* | 8/2017 | Chadha | H04L 61/35 |
| 2017/0261949 A1* | 9/2017 | Hoffmann | G05B 13/0265 |
| 2017/0288965 A1* | 10/2017 | Cebere | H04L 41/046 |
| 2017/0317905 A1* | 11/2017 | Schimmelpfeng | H04L 43/04 |
| 2018/0032418 A1 | 2/2018 | Wang et al. | |
| 2018/0191593 A1* | 7/2018 | De Knijf | G06F 16/20 |
| 2018/0350015 A1 | 12/2018 | Gordon et al. | |
| 2018/0367560 A1 | 12/2018 | Mahaffey et al. | |
| 2019/0020659 A1 | 1/2019 | Loni et al. | |
| 2019/0042303 A1 | 2/2019 | Chen et al. | |
| 2019/0096280 A1* | 3/2019 | Saunders | G09B 5/12 |
| 2019/0114417 A1 | 4/2019 | Subbarayan et al. | |
| 2019/0215227 A1* | 7/2019 | Bonanni | H04L 67/60 |
| 2019/0230474 A1 | 7/2019 | Lanes et al. | |
| 2020/0067777 A1* | 2/2020 | Tandel | H04L 41/0893 |
| 2020/0067919 A1* | 2/2020 | Patwardhan | H04L 12/2803 |
| 2020/0118039 A1* | 4/2020 | Kocberber | G06N 5/003 |
| 2022/0052918 A1 | 2/2022 | Cieslak et al. | |

OTHER PUBLICATIONS

Rizvandi et al. "On Using Pattern Matching Algorithms in MapReduce Applications", 2011, IEEE (Year: 2011).

Unpublished U.S. Appl. No. 16/385,305 to Cieslak et al. filed Apr. 16, 2019 entitled Network Device Performance Metrics Determination.

\* cited by examiner

BENCHMARKING TO INFER CONFIGURATION OF SIMILAR DEVICES

CROSS-REFERENCE TO RELATED APPLICATION

This application claims priority to U.S. Provisional Application Ser. No. 62/827,014 entitled BENCHMARKING TO INFER CONFIGURATION OF SIMILAR DEVICES, filed on Mar. 30, 2019, the contents of which are incorporated fully herein by reference.

TECHNICAL FIELD

Examples set forth in this disclosure relate generally to applications running on client devices and server systems supporting those devices. More particularly, but not by way of limitation, this disclosure addresses systems and methods for optimizing configuration parameters of an application on client devices having unknown device types in order to enhance user experiences.

BACKGROUND

Performance of an application, conventionally referred to as an app, that runs on a client device varies from device to device. There are currently over 25,000 client devices operable on the Android® platform, and over 60 client devices operable on the iOS® platform. Performance of an application is affected by the hardware and software of the client device running the application.

BRIEF DESCRIPTION OF THE DRAWINGS

The disclosed subject matter is best understood from the following detailed description when read in connection with the accompanying drawings, with like elements having the same reference numerals. When a plurality of similar elements is present, a single reference numeral may be assigned to the plurality of similar elements with a small letter designation referring to specific elements. When referring to the elements collectively or to a non-specific one or more of the elements, the small letter designation may be dropped. To easily identify the discussion of any particular element or act, the most significant digit or digits in a reference number refer to the figure number in which that element is first introduced. This emphasizes that according to common practice, the various features of the drawings are not drawn to scale unless otherwise indicated. On the contrary, the dimensions of the various features may be expanded or reduced for clarity. Included in the drawings are the following figures.

DETAILED DESCRIPTION

Figure 1:
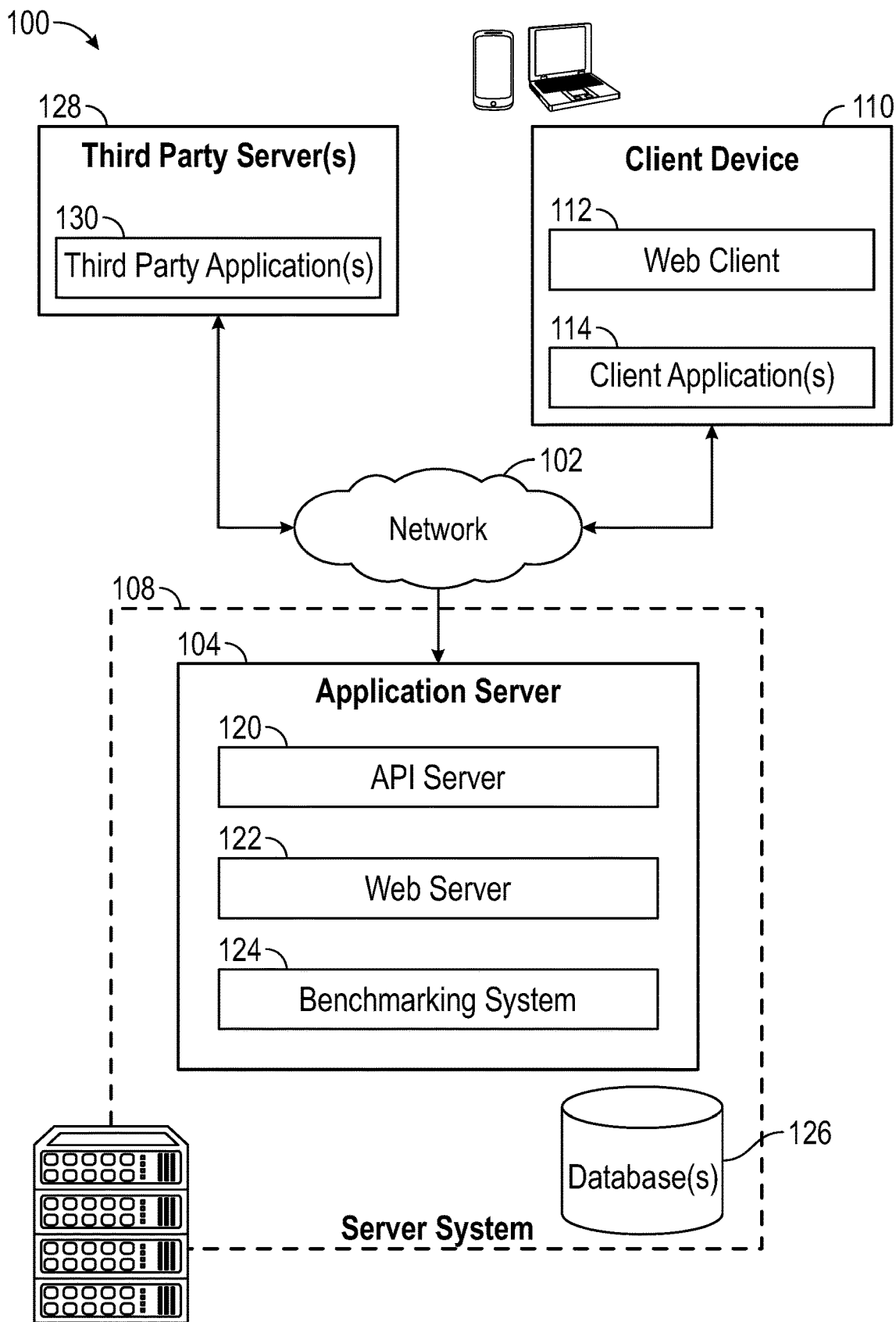
FIG. 1 is a block diagram of an example benchmarking system in an online client-server system.

Aspects of the subject matter disclosed herein are directed to categorizing unknown devices based on performance metrics of the devices. Benchmark applications for detecting performance metrics are distributed to the client devices (e.g., as part of an application such as a social media application). The performance metrics for unknown devices are then compared to performance metrics of known devices to categorize the unknown devices with known devices having similar performance metrics.

The description that follows includes systems, methods, techniques, instruction sequences, and computing machine program products illustrative of examples of the disclosure. In the following description, for the purposes of explanation, numerous specific details are set forth in order to provide an understanding of various examples of the disclosed subject matter. It will be evident, however, to those skilled in the art, that examples of the disclosed subject matter may be practiced without these specific details. In general, well-known instruction instances, protocols, structures, and techniques are not necessarily shown in detail.

In accordance with one example, a method is provided for categorizing devices. The method includes distributing, by a server system, benchmark applications to a plurality of client devices, the benchmark applications associated with an application on the plurality of client devices, the benchmark applications configured to produce performance metrics for each client device; receiving, by the server system, the performance metrics from the plurality of client devices; comparing, by the server system, the performance metrics of a client device having an unknown device type to the performance metrics of client devices having known device types; and categorizing, by the server system, the client device having the unknown device type according to similarity of the performance metrics of the client device having the unknown device type to the performance metrics of one or more of the client devices having known device types.

In accordance with another example, a system is provided for categorizing devices. The system categorizes devices by distributing benchmark applications to a plurality of client devices, the benchmark applications associated with an application on the plurality of client devices, the benchmark applications configured to produce performance metrics for each client device; receiving the performance metrics from the plurality of client devices; comparing the performance metrics for a client device having an unknown device type to the performance metrics of client devices having known device types; and categorizing the client device having the unknown device type according to similarity of the performance metrics for the client device having the unknown device type to the performance metrics of one or more of the client devices having known device types.

In accordance with another example, a non-transitory processor-readable storage medium is provided that stores processor-executable instructions that, when executed by a processor of a machine, cause the machine to perform operations. The operations performed by the machine include distributing benchmark applications to a plurality of client devices, the benchmark applications associated with an application on the plurality of client devices, the benchmark applications configured to produce performance metrics for each client device; receiving the performance metrics from the plurality of client devices; comparing the performance metrics of a client device having an unknown device type to the performance metrics of client devices having known device types; and categorizing the client device having the unknown device type according to similarity of the performance metrics of the client device having the unknown device type to the performance metrics of one or more of the client devices having known device types.

FIG. 1 is a block diagram illustrating a system 100, according to some examples, configured to automatically categorize devices having unknown device types. The system 100 includes one or more client devices such as client device 110. The client device 110 includes, but is not limited to, a mobile phone, desktop computer, laptop, portable digital assistants (PDA), smart phone, tablet, ultrabook, netbook, laptop, multi-processor system, microprocessor-based or programmable consumer electronic, game console, set-top box, computer in a vehicle, or any other communication device that a user may utilize to access the system 100. In some examples, the client device 110 includes a display module (not shown) to display information (e.g., in the form of user interfaces). In further examples, the client device 110 includes one or more of touch screens, accelerometers, gyroscopes, cameras, microphones, global positioning system (GPS) devices, and so forth. The client device 110 may be a device of a user that is used to access and utilize an online social platform. For example, the client device 110 may be used to input information to create an account, exchange information over a network 102, and so forth.

For example, client device 110 may be a device of a user who is using a social media application on the device. Client device 110 may call a server for a social platform (e.g., hosted by server system 108) via the social media application directly or through one or more third-party servers 128 (e.g., utilizing one or more third-party applications 130). Application server 104 tracks information regarding client device (e.g., make, model number, central processing unit (CPU) type, graphics processing unit (GPU) type, associated performance metrics, etc.) as a dataset in database 126. By analyzing the dataset using techniques disclosed herein, the application server 104 is able to automatically categorize devices of an unknown device type.

The components of a client device impact the experience a user has when interacting with a social media platform. Current, expensive state-of-the-art client devices are able to handle complex calculations and image rendering much better than older and/or less expensive client devices. Meanwhile, users continually want new and improved features that require ever increasing processing resources. In order to address these demands, while providing acceptable performed on less powerful client devices, an application may be set up with feature levels (e.g., 0-5) corresponding to one or more features. If a device is a state-of-the-art device type, that device may be categorized to offer level 5 features of an application. On the other hand, if a device is older device type, it may be categorized to over level 2 feature levels for certain features and level 3 feature levels for other features. There are over 25,000 different client device types accessing social media platforms. Due to the number of device types, manually categorizing these devices is not practical. The inventors discovered that client devices having unknown device types can deliver an appropriate user experience if they are categorized with other device having a known device type based on performance metrics of the devices.

One or more users may be a person, a machine, or other means of interacting with the client device 110. In examples, the user may not be part of the system 100 but may interact with the system 100 via the client device 110 or other means. For instance, the user may provide input (e.g., touch screen input or alphanumeric input) to the client device 110 and the input may be communicated to other entities in the system 100 (e.g., third-party servers 128, server system 108, etc.) via the network 102. In this instance, the other entities in the system 100, in response to receiving the input from the user, may communicate information to the client device 110 via the network 102 to be presented to the user. In this way, the user interacts with the various entities in the system 100 using the client device 110.

The system 100 further includes a network 102. One or more portions of network 102 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a cellular telephone network, a wireless network, a WiFi network, another type of network, or a combination of two or more such networks.

The client device 110 may access the various data and applications provided by other entities in the system 100 via web client 112 (e.g., a browser) and/or one or more client applications 114. The client device 110 may include one or more client application(s) 114 (also referred to as "apps") such as, but not limited to, a web browser, messaging application, electronic mail (email) application, an e-commerce site application, a mapping or location application, and the like.

In some examples, one or more client application(s) 114 are included in a given one of the client device 110, and configured to locally provide the user interface and at least some of the functionalities, with the client application(s) 114 configured to communicate with other entities in the system 100 (e.g., third-party server(s) 128, server system 108, etc.), on an as-needed basis, for data processing capabilities not locally available (e.g., to access location information, to authenticate a user, etc.). Conversely, one or more client application(s) 114 may not be included in the client device 110, and then the client device 110 may use its web browser to access the one or more applications hosted on other entities in the system 100 (e.g., third-party server(s) 128, server system 108, etc.).

A server system 108 provides server-side functionality via the network 102 (e.g., the Internet or wide area network (WAN)) to: one or more third party server(s) 128, and one or more client devices 110. The server system 108 includes an application program interface (API) server 120, a web server 122, and a benchmarking system 124, that may be communicatively coupled with one or more database(s) 126.

The one or more database(s) 126 may be storage devices that store data (e.g., in a dataset) related to users of the server system 108, applications associated with the server system 108, cloud services, housing market data, and so forth. The one or more database(s) 126 may further store information related to third party server(s) 128, third-party application(s) 130, client device 110, client application(s) 114, users, and so forth. In one example, the one or more database(s) 126 may be cloud-based storage.

The server system 108 may be a cloud computing environment, according to some examples. The server system 108, and any servers associated with the server system 108, may be associated with a cloud-based application. In one example the server system 108 includes a benchmarking system 124. Benchmarking system 124 may include one or more servers and may be associated with a cloud-based application. Benchmarking system 124 may distribute benchmark applications (e.g., as part of a social medium application or update thereto) to client devices, obtain performance metrics from those client devices, and store those results in database(s) 126. The benchmarking system 124 analyzes a dataset including the performance metrics from the client devices to categorize client devices of an unknown type with devices having a known type.

The system 100 further includes one or more third party server(s) 128. The one or more third-party server(s) 128 may include one or more third-party application(s) 130. The one or more third-party application(s) 130, executing on third party server(s) 128 may interact with the server system 108 via API server 120 via a programmatic interface provided by the API server 120. For example, one or more of the third-party applications 132 may request and utilize information from the server system 108 via the API server 120 to support one or more features or functions on a website hosted by the third party or an application hosted by the third party. The third-party application(s) 130, for example, may provide software version analysis functionality that is supported by relevant functionality and data in the server system 108.

As user herein, the term benchmark application means an application configured to run on a client device to produce and/or collect one or more performance metrics for the client device. Performance metrics include, by way of non-limiting example, dynamic parameters such as how many calculations can be performed in a defined period of time and static parameters such as whether or not particular hardware or software API is supported. Multiple benchmark applications may be used to assess multiple performance metrics. The benchmark application may be incorporated into another application on the client device (e.g., a social media application) or may be a standalone application. In one example, the benchmark application is binary machine language instructions (i.e., native code) running directly on the CPU/GPU. In another example, the benchmark application is a Java application and results are reported using an on-device portal (ODP).

In an example, a benchmark table includes the attributes benchmark name, group, type, dimensions, and performance metric/measurement data. The name attribute is a descriptive name string type for the benchmark applications such as "Gflop calculation" or "NumPrimesCalculated10 ms." The group attribute is an enumerated type that specifies what group or functionality this benchmark application is meant to measure. This is useful for batch scheduling benchmark applications that share the same underlying processing resources. The type attribute is an enumerated type that whether the benchmark application is looking for the benchmark to converge to an average or if there should be one value decided on. The dimensions attribute is a multi-faceted data type (e.g., operating system, device type, application version, etc.). The measurement data is a string type data type for transferring measurement parameters between the client device 110 and the server system 108.

Figure 2A:
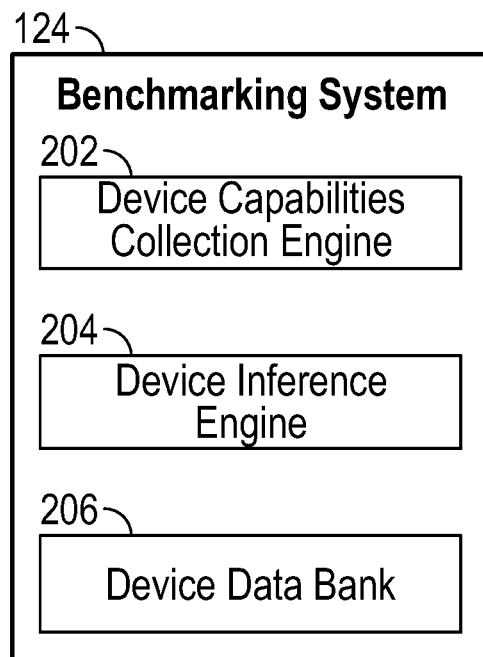
FIG. 2A is a block diagram illustrating an example benchmarking system.

FIG. 2A is a block diagram illustrating an example of the benchmarking system 124. The benchmarking system 124 includes a device capabilities collection engine 202, a device inference engine 204, and a device data bank 206. The device data bank 206 is stored in the database 126 of the server system 108. The device capabilities collection engine 202 and the device inference engine runs on the application server 104 of the server system 108.

The device capabilities collection engine 202 is configured to distribute benchmarks applications and to collect corresponding performance metrics. Performance metrics are stored by device capabilities collection engine 202 in device data bank 206.

The device inference engine 204 is configured to analyze performance metrics and determine which device(s) of a known type are most similar to a device of an unknown type. The device inference engine 204 develops signatures based on performance metrics received in performance metrics, compares the signatures of devices having an unknown type to signatures of devices having a known type, and categorizes the devices of the unknown type with devices of the known type that are most similar. In an example, the device inference engine applies fuzzy logic to compare a signature of a device having multiple dimensions (e.g., each dimension representing a different performance metric such as CPU processor speed and GPU processor speed) with signatures of other devices to determine similarity between the signatures.

Figure 2B:
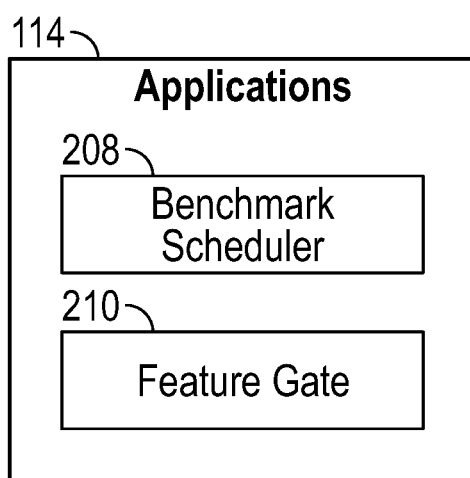
FIG. 2B is a block diagram illustrating example components for implementing benchmarking and feature gating on a client device.

FIG. 2B is a block diagram illustrating an example of the client applications 114. The client applications 114 include a benchmark scheduler 208 and a feature gate 210. The benchmark scheduler 208 communicates with processing systems within client device 110, e.g., to determine when client device 110 is performing other tasks, is in a charging state, is in a WiFi state, is in a battery level state, etc. The benchmark scheduler 208 launches benchmark applications, assembles performance metrics, and transfers performance metrics to the benchmarking system 124 of the server system 108.

The feature gate 210 controls whether a feature of an application (e.g., a social media application) is offered on a device and the level of functionality for that feature. For example, multiple features within an application may each have an associated feature level (e.g., from 0 to 5 with a zero representing that the feature is off and a 5 representing fully functional). Example feature levels include how many points of focus are presented for an image, how many images are being simultaneously loaded in background processing while viewing a current image, whether images are presented for corresponding text, and how many areas within a video image are simultaneously being tracked for detected facial features. The feature gate 210 receives communications from the server system 108 for setting the feature levels.

Figure 3:
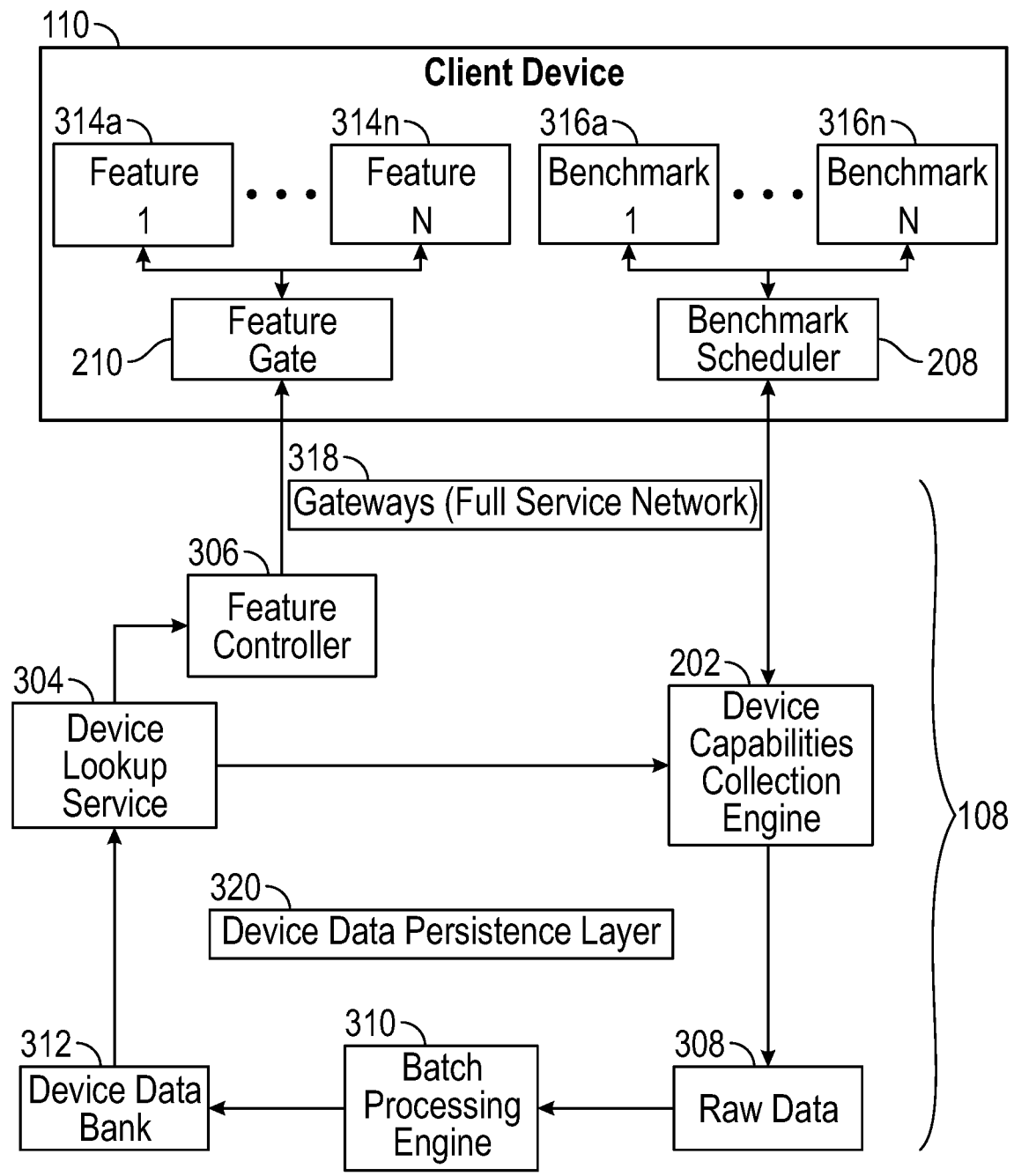
FIG. 3 is a block diagram illustrating server and client components for implementing benchmarking and feature gating.

FIG. 3 depicts an example of the server system 108 and the client device 110 components for implementing benchmarking and feature gating. A device capabilities collection engine 202 communicates with the benchmark scheduler 208 of the client devices 110 to distribute benchmark applications and collect performance metrics. Additionally, the device capabilities collection engine 202 stores raw data 308 (e.g., in a database 126) received from the client devices 110 in the device data persistence layer 320 for processing. The device data persistence layer 320 is a software layer for passing communication between the application layer and the data storage devices (e.g., device data bank 312 in database 126).

In an example, the device capabilities collection engine 202 is a backend service that client devices 110 query to find out what benchmarks they should run. The device capabilities collection engine 202 is coupled to device lookup service 304 (which maintains a table of device information) to determine what information is missing for a given device. The device capabilities collection engine 202 is configured with a priority scheme so that the most important benchmarks are run first.

The device lookup service 304 is responsible for making the application usable across many different client devices, regardless of their performance metrics. In an example, the device lookup service 304 stores a table (e.g., in database 126) containing a device identifier field (e.g., model number), a category field (e.g., category 0-5), and one or more benchmark fields. Each category represented in the category field is associated with one or more features levels for features being offered by the application. The device lookup service 304 is able to provide appropriate feature levels to a device (e.g., via a feature controller 306 to a feature gate 210) based on the category in which the device is categorized. It is contemplated that if insufficient benchmark information is available, the category field will be blank or will default to a category with a particular feature level (e.g., feature level 3). In other words, the system provides default values for devices where a consensus is not reached for a value on a benchmark or capability.

The feature controller 306 communicates with the device lookup service 304 and the feature gate 210 of the client device 110. The feature controller is configured to gate features based on if a feature is supported on a particular client device 110 and if the feature will perform well via correlated benchmarks.

The batch processing engine 310 processes the raw data 308 and stores it in the device data bank 312. The processing includes filtering the raw data 308 and performing analysis to build the device data bank 312. In an example, the batch processing engine 310 computes device cluster, builds a device capabilities map based on performance metrics for a given model of device, and computes benchmark scores (e.g., based on performance metrics) and a benchmark group score. The results from the computations are stored in the device data bank 312.

Client devices 110 communicate with the server system 108 through a network gateway 318 (e.g., via the Internet). In an example, the gateway 318 is a full-service network gateway.

Benchmark scheduler 208 communicates with device capabilities collection engine 202 from which it receives requests (benchmark commands), which trigger running one or more of the benchmark applications (Benchmark 1 316a to Benchmark N 316n) on the client device 110 to gather performance metrics of the client device 110. The benchmark scheduler 208 is configured to schedule benchmarks at times that do not impact the user experience with the application (e.g., by detecting when various components are at rest or the client device is charging, and scheduling applicable benchmarks during this time). To facilitate scheduling, benchmarks are configured to execute within a specified period of time (e.g., "How many primes were calculated in 10 ms?," rather than "How long does it take to calculate 100 primes?").

The feature gate 210 communicates with the feature controller 306. The feature gate 210 is configured to turn on/off and/or set the level of features (Feature 1 314a to Feature N 314n) within the application in order to gate features based on if a feature is supported on a phone and if the feature will perform well via correlated performance metrics produced by benchmark applications. The feature gate 210 may have a default feature setting for a client device 110 without a consensus value on a benchmark or capability.

Figure 4:
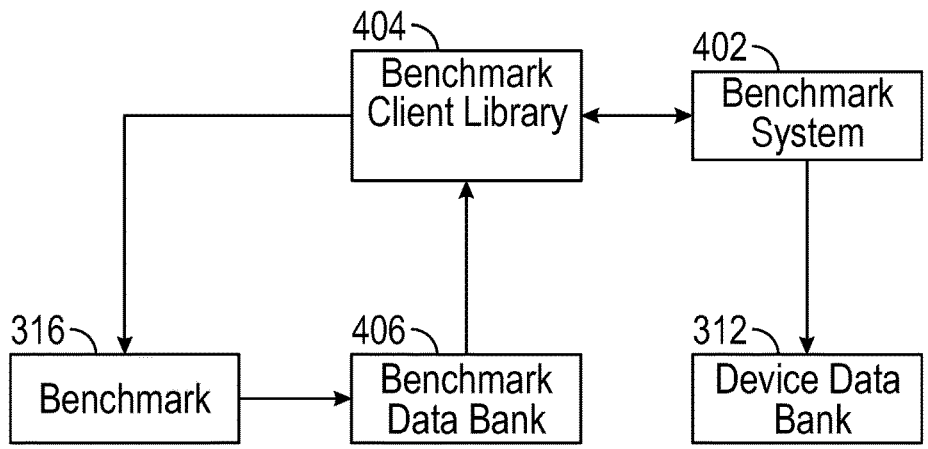
FIG. 4 is a block diagram illustrating implementation of benchmarking using a benchmark system.

FIG. 4 depicts an example for scheduling benchmark applications, running benchmark applications, and obtaining performance metrics from the benchmark applications. In the example, a benchmark system 402 in the server system 108 (e.g., within device capabilities collection engine 202) communicates with a benchmark client library 404 in the client device 110 (e.g., within benchmark scheduler 208).

In this example, the benchmark system 402 schedules benchmark application execution in a configuration synchronization (config sync) response. The benchmark client library 404 initiates the process by sending a configuration sync request to the benchmark system 402. The benchmark system 402 identifies performance metrics (benchmark data) needed from the client device 110 (e.g., by querying device lookup service 304) and sends a request for the needed data in the config sync response to the benchmark client library 404. A repeated enumerated type (enum) field may be added to the config sync response to indicate the benchmarks to execute.

The benchmark client library 404 identifies a benchmark application(s) that needs to run to obtain the needed data based on the indicated benchmarks to execute from the benchmark system 402 and schedules the benchmark application(s) to run at a time identified to have minimal impact on the user (e.g., while the client device 110 is charging, when the client device is idle, etc.). The benchmark client library 404 stores the results of the benchmark applications (s) in a benchmark data bank 406 for return to the benchmark system 402 in a subsequent config sync request. A protocol type (proto) field may be added in the subsequent config sync request for returning the results. When the benchmark client library 404 prepares a config sync request, it looks up the performance metrics in the benchmark data bank 406, attaches the data in the request, and clears the benchmark data bank 406.

When the benchmark system 402 receives a config request with attached performance metrics, it writes the results to the device data bank 312.

The delay between a benchmark request and response can be hours or days for a given user. To avoid asking all the users of a device model to run the benchmarks when benchmarks are missing, the server can increment a Memcached backed counter. When a benchmark 316 has been requested for a device, the server would stop requesting when a threshold (e.g. 100 per device model per day) has been reached. Additionally, a per-user Boolean in memcache indicates if a benchmark application has already been requested for the user on that day. The in memcache may be checked before sending a request in order to avoid resending the same request to the same client device over and over.

In is contemplated that different client devices of the same model may report a spectrum of results for a given benchmark depending on use, battery lever, battery saving mode, etc. A separate database table may be used to store results as a series and update the device data bank with an aggregated value such as the median value, e.g., when there are enough data points in the series for the value to stabilize (e.g., 100 data points).

Figure 5:
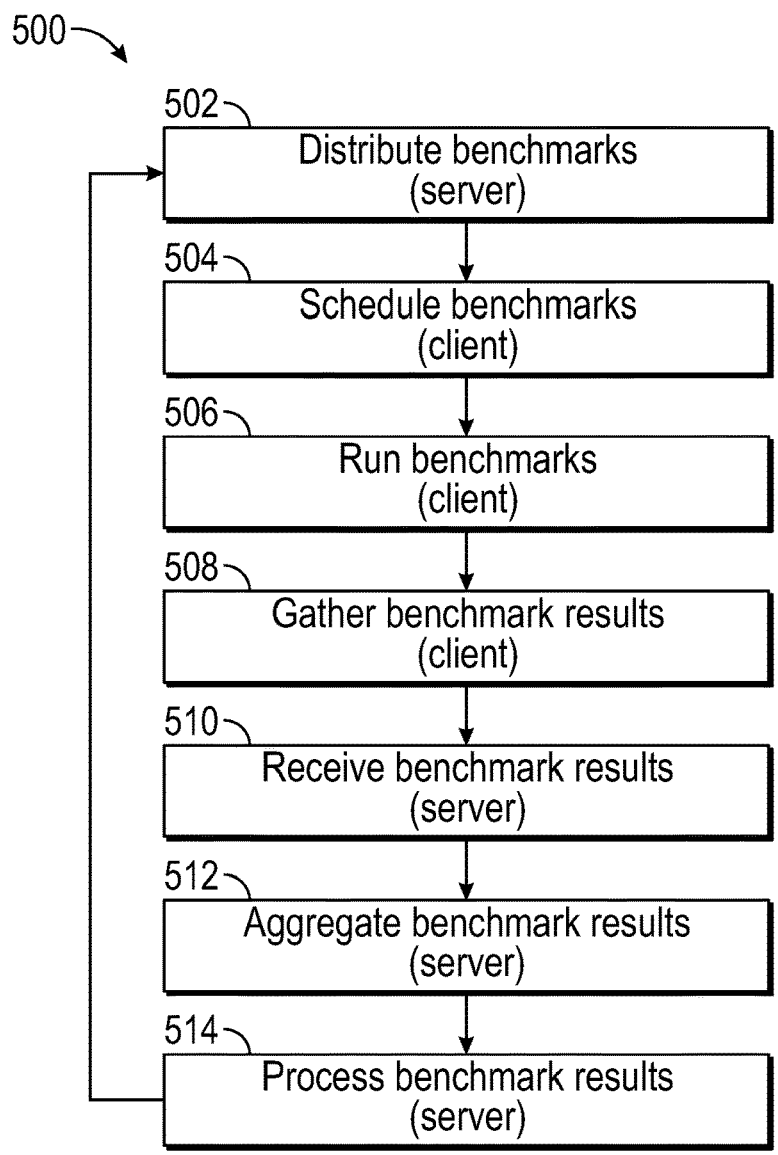
FIG. 5 is a flow diagram illustrating an example method for benchmarking client devices.
Figure 6:
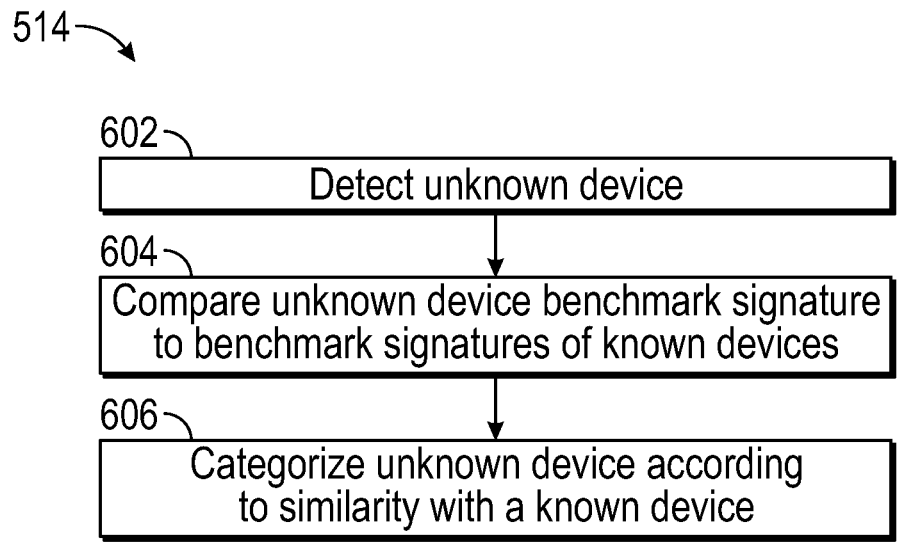
FIG. 6 is a flow diagram illustrating an example method for configuring unknown devices through comparison of performance metrics.
Figure 7:
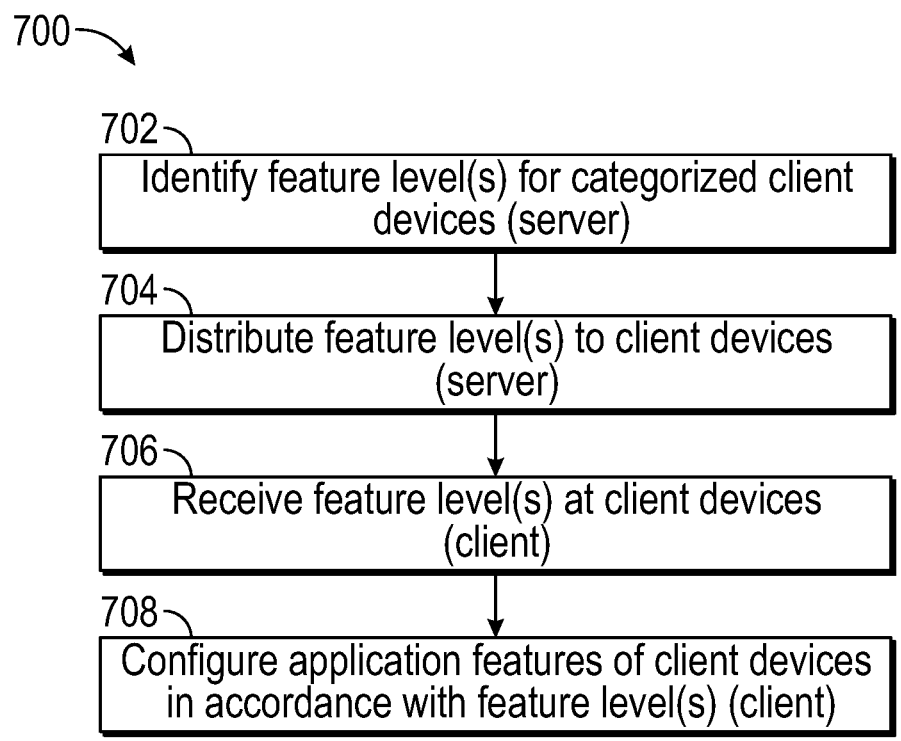
FIG. 7 is a flow diagram illustrating an example method for configuring application features of client devices in accordance with feature levels determined through benchmarking.

FIG. 5 is a flow diagram illustrating an example method 500 for distributing benchmark applications and processing results, FIG. 6 is a flow diagram illustrating an example method 514 for categorizing unknown device in the processing block of FIG. 5, and FIG. 7 is a flow diagram of an example method 700 for configuring application features. Although the below description of the methods refers to the benchmarking system 124, other systems for distributing and processing benchmarks and categorizing unknown devices based on performance metrics will be understood from the description herein. The flowcharts may describe the operations as a sequential process, however, many of the operations can be performed in parallel or concurrently. In addition, the order of the operations may be re-arranged. A process is terminated when its operations are completed. A process may correspond to a method, a procedure, etc. The steps of a method may be performed in whole or in part, may be performed in conjunction with some or all of the steps in other methods, and/or may be performed by any number of different systems, such as the systems described in FIGS. 1, 2A, 2B, 3, 4, and 8-10.

At block 502, the server system 108 distributes the benchmark applications and requests to run the benchmark applications. The server system 108 may distribute the benchmark applications, e.g., as part of an application (e.g., a social media application). The device capabilities collection engine 202 may then distribute requests to run the benchmark applications based on information receive from the device look-up service 304. In an example, the device look-up service 304 periodically scans a table maintained by the device look-up service (e.g., in database 126) to identify devices (e.g., identified by model number) having incomplete performance metrics. The device look-up service 304 then communicates a device identifier and an indicator corresponding to the missing information to the device capabilities collection engine 202, which distributes requests to run benchmark applications corresponding to the missing information.

At block 504, the client device 110 schedules the benchmark applications distributed by the server system 108. The benchmark scheduler 208 of the client device 110 schedules the benchmark applications when a run request is received from the server system 108, e.g., as described above with reference to FIG. 4.

At block 506, the client device 110 runs the benchmark applications and, at block 508, gathers performance metrics (benchmark results) produced by the running the benchmark applications.

At block 510, the server system 108 receives the performance metrics. The device capabilities collection engine 202 of server system 108 receives the performance metrics, e.g., as described above with reference to FIG. 4.

At block 512, the server system 108 aggregates the benchmark results. The batch processing engine 310 may aggregate the benchmark results based on device type and store the aggregated results in the device data bank 312.

At block 514, the server system 108 processes the performance metrics. The batch processing engine 310 processes the performance metrics, e.g., to compute device clusters, build a device capabilities map based on performance metrics for a given model of device, and compute benchmark scores. The processed results may be stored in the database 126.

The server system 108 may process the performance metrics in accordance with the method depicted in FIG. 6. At block 602, the server system 108 detects an unknown device. An unknown device (or group of devices) is a device for which one or more feature level categories are not yet available. Thus, the unknown device may be detected by reviewing a category field in a table maintained by the device lookup service 304. The unknown device (or group of devices) may be referenced using its model number.

At block 604, the server system 108 compares a signature of the unknown device to signatures of known devices. The device lookup service 304 may apply a fuzzy comparison algorithm to compare the signature of the unknown device to the signatures of the known devices.

At block 606, the server system 108 categorizes the unknown devices according to signature similarity with a known device (i.e., with a device already having a complete category field stored in the table maintained by the device lookup service 304.

The sever system 108 may utilize the categorized device information to configure an application on the unknown client device according to the method of FIG. 7.

At block 702, the server system 108 identifies feature levels for categorized client device 110. The feature controller 306 receives a device type identifier (e.g., model number) from the device look-up service 304 and associated feature levels.

At block 704, the server system 108 distributes feature levels to the client device 110. The feature controller 306 distributes the feature levels to the feature gate 210 of the appropriate client device, e.g., identified based on model number.

At block 706, the client device 110 receives the feature levels. The feature gate 210 receives the feature levels from the feature controller 306. The feature levels may be communicated using the config sync request/reply as described above for the benchmark application scheduling with reference to FIG. 4

At block 708, the client device 110 configures features of the application in accordance with the received feature levels. The client device 110 configures features levels within the application that are preconfigured to be turned on/off and/or set to a particular level.

Figure 8:
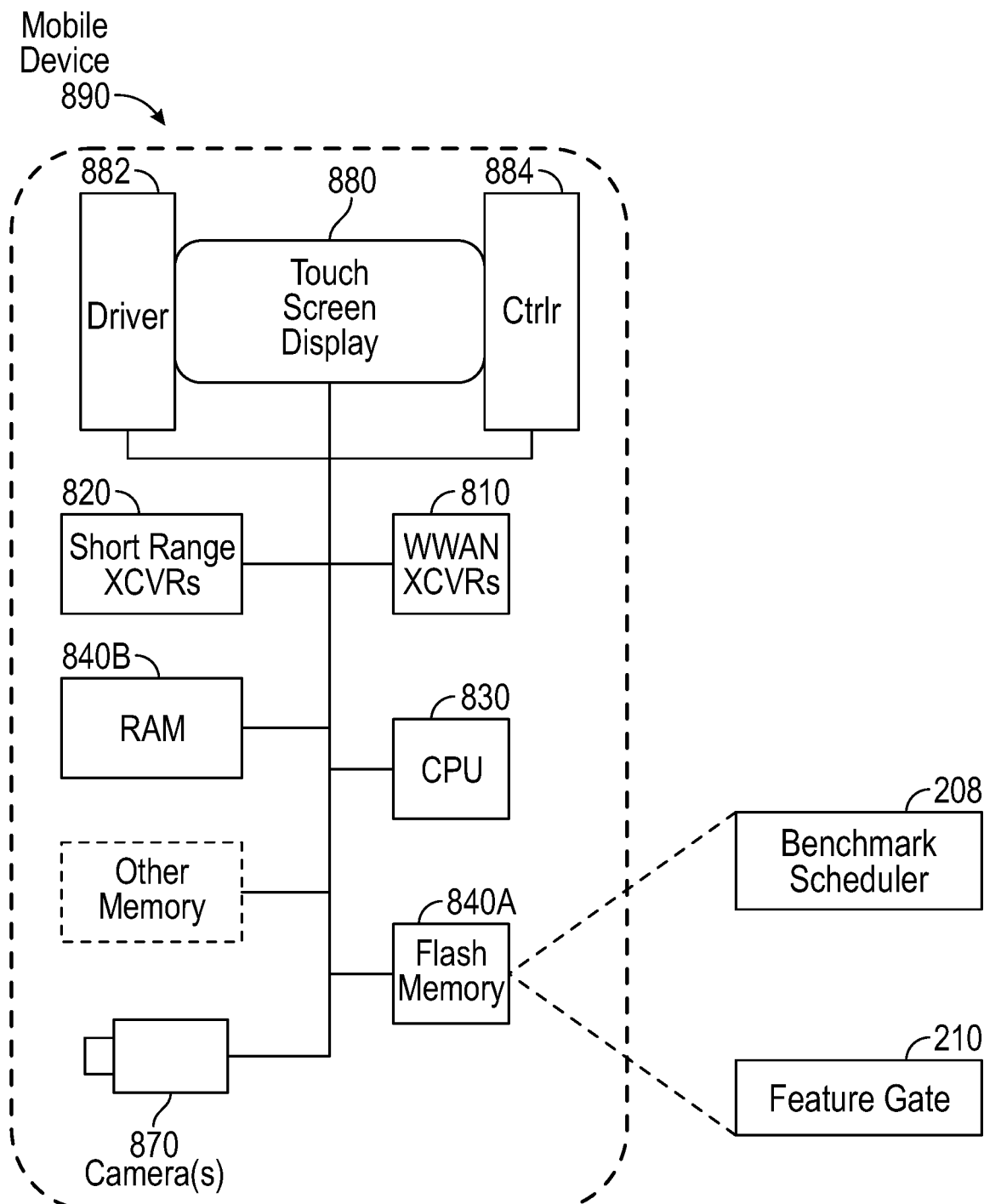
FIG. 8 is a diagrammatic representation of an example hardware configuration for a client device embodied as a mobile device.

FIG. 8 is a high-level functional block diagram of an example client device 110 embodied as an example mobile device 890 that includes the benchmark scheduler 208 and the feature gate 210. Mobile device 890 includes a flash memory 840A which includes programming to perform all or a subset of the functions described herein for benchmark scheduler 208 and feature gate 210. Mobile device 890 can include a camera 870 that comprises at least two visible light cameras (first and second visible light cameras with overlapping fields of view) or at least on visible light camera and a depth sensor with substantially overlapping fields of view. Memory 840A may further include multiple images or video, which are generated via the camera 870.

As shown, the mobile device 890 includes an image display 880, an image display driver 882 to control the image display 880, and a controller 884. In the example of FIG. 8, the image display 880 and a user input device are integrated together into a touch screen display.

Examples of touch screen type mobile devices that may be used include (but are not limited to) a smart phone, a personal digital assistant (PDA), a tablet computer, a laptop computer, or other portable device. However, the structure and operation of the touch screen type devices is provided by way of example; and the subject technology as described herein is not intended to be limited thereto. For purposes of this discussion, FIG. 8 therefore provides block diagram illustrations of the example mobile device 890 having a touch screen display for displaying content and receiving user input as (or as part of) the user interface.

As shown in FIG. 8, the mobile device 890 includes at least one digital transceiver (XCVR) 810, shown as WWAN XCVRs, for digital wireless communications via a wide area wireless mobile communication network. The mobile device 890 also includes additional digital or analog transceivers, such as short range XCVRs 820 for short-range network communication, such as via NFC, VLC, DECT, ZigBee, Bluetooth™, or WiFi. For example, short range XCVRs 820 may take the form of any available two-way wireless local area network (WLAN) transceiver of a type that is compatible with one or more standard protocols of communication implemented in wireless local area networks, such as one of the Wi-Fi standards under IEEE 802.11.

To generate location coordinates for positioning of the mobile device 890, the mobile device 890 can include a global positioning system (GPS) receiver. Alternatively, or additionally the mobile device 890 can utilize either or both the short range XCVRs 820 and WWAN XCVRs 810 for generating location coordinates for positioning. For example, cellular network, WiFi, or Bluetooth™ based positioning systems can generate very accurate location coordinates, particularly when used in combination. Such location coordinates can be transmitted to the eyewear device over one or more network connections via XCVRs 810, 820.

The transceivers 810, 820 (network communication interface) conforms to one or more of the various digital wireless communication standards utilized by modern mobile networks. Examples of WWAN transceivers 810 include (but are not limited to) transceivers configured to operate in accordance with Code Division Multiple Access (CDMA) and 3rd Generation Partnership Project (3GPP) network technologies including, for example and without limitation, 3GPP type 2 (or 3GPP2) and LTE, at times referred to as "4G." For example, the transceivers 810, 820 provide two-way wireless communication of information including digitized audio signals, still image and video signals, web page information for display as well as web related inputs, and various types of mobile message communications to/from the mobile device 890.

The mobile device 890 further includes a microprocessor, shown as CPU 830, sometimes referred to herein as the host controller. A processor is a circuit having elements structured and arranged to perform one or more processing functions, typically various data processing functions. Although discrete logic components could be used, the examples utilize components forming a programmable CPU. A microprocessor for example includes one or more integrated circuit (IC) chips incorporating the electronic elements to perform the functions of the CPU. The processor 830, for example, may be based on any known or available microprocessor architecture, such as a Reduced Instruction Set Computing (RISC) using an ARM architecture, as commonly used today in mobile devices and other portable electronic devices. Of course, other processor circuitry may be used to form the CPU 830 or processor hardware in smartphone, laptop computer, and tablet.

The microprocessor 830 serves as a programmable host controller for the mobile device 890 by configuring the mobile device 890 to perform various operations, for example, in accordance with instructions or programming executable by processor 830. For example, such operations may include various general operations of the mobile device, as well as operations related to the programming for the benchmark scheduler 208 and the feature gate 210. Although a processor may be configured by use of hardwired logic, typical processors in mobile devices are general processing circuits configured by execution of programming.

The mobile device 890 includes a memory or storage device system, for storing data and programming. In the example, the memory system may include a flash memory 840A and a random access memory (RAM) 840B. The RAM 840B serves as short term storage for instructions and data being handled by the processor 830, e.g., as a working data processing memory. The flash memory 840A typically provides longer term storage.

Hence, in the example of mobile device 890, the flash memory 840A is used to store programming or instructions for execution by the processor 830. Depending on the type of device, the mobile device 890 stores and runs a mobile operating system through which specific applications, including programming for the benchmark scheduler 208 and the feature gate 210 are executed. Applications, such as benchmark applications and programming for the benchmark scheduler 208 and the feature gate 210, may be a native application, a hybrid application, or a web application (e.g., a dynamic web page executed by a web browser) that runs on mobile device 890. Examples of mobile operating systems include Google Android, Apple iOS (I-Phone or iPad devices), Windows Mobile, Amazon Fire OS, RIM BlackBerry operating system, or the like.

Figure 9:
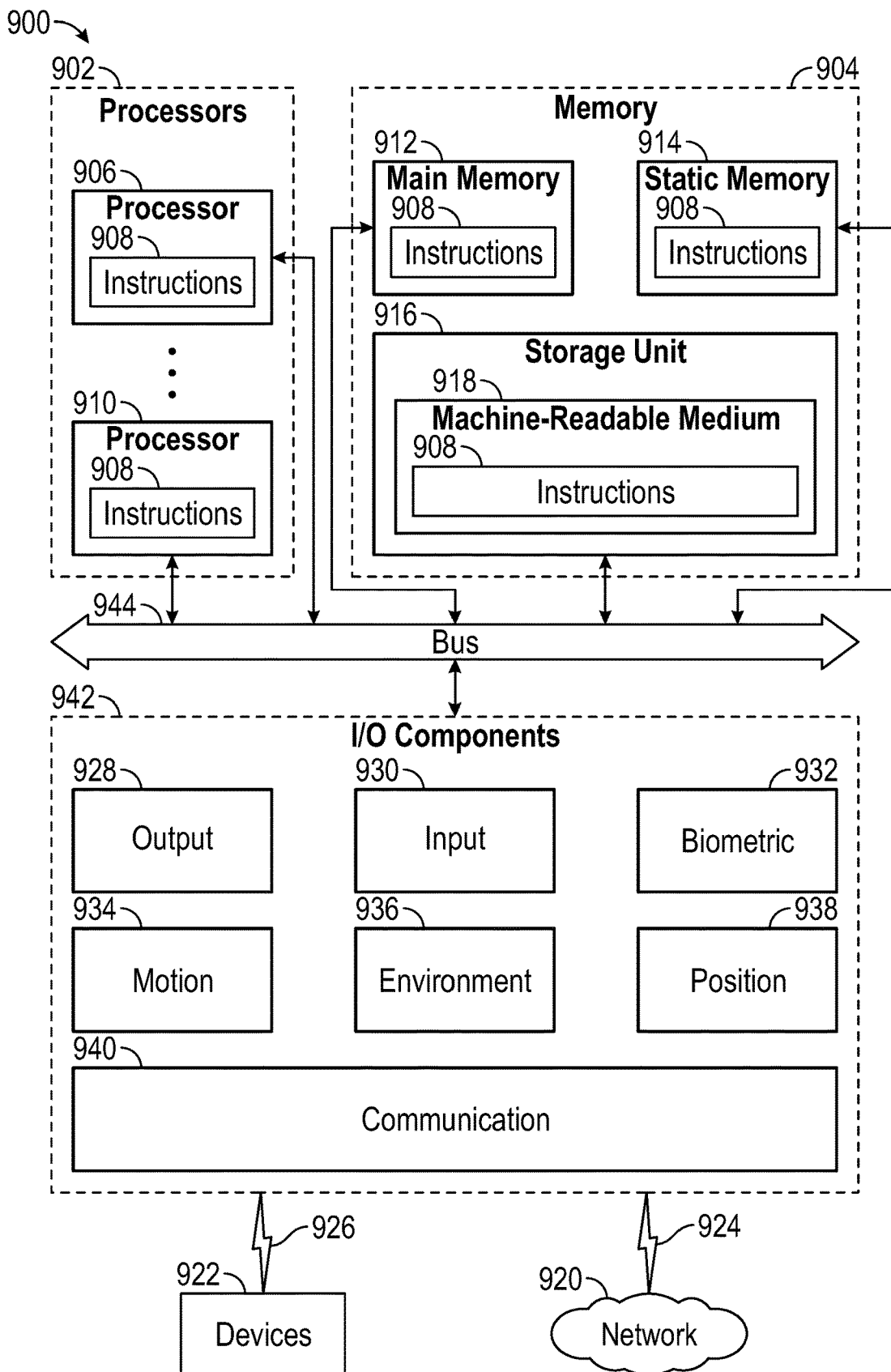
FIG. 9 is a diagrammatic representation of a machine in the form of a computer system within which a set of instructions may be executed for causing the machine to perform any one or more of the methodologies described herein, in accordance with some examples.

FIG. 9 is a diagrammatic representation of a machine 900 within which instructions 908 (e.g., software, a program, an application, an applet, an app, or other executable code) for causing the machine 900 to perform any one or more of the methodologies discussed herein may be executed. For example, the instructions 908 may cause the machine 900 to execute any one or more of the methods described herein. The instructions 908 transform the general, non-programmed machine 900 into a particular machine 900 programmed to carry out the described and illustrated functions in the manner described. The machine 900 may operate as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment.

The machine 900 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 908, sequentially or otherwise, that specify actions to be taken by the machine 900. Further, while only a single machine 900 is illustrated, the term "machine" shall also be taken to include a collection of machines that individually or jointly execute the instructions 908 to perform any one or more of the methodologies discussed herein.

The machine 900 may include processors 902, memory 904, and I/O components 942, which may be configured to communicate with each other via a bus 944. In an example, the processors 902 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 906 and a processor 910 that execute the instructions 908. The term "processor" is intended to include multi-core processors that may comprise two or more independent processors (sometimes referred to as "cores") that may execute instructions contemporaneously. Although FIG. 9 shows multiple processors 902, the machine 900 may include a single processor with a single core, a single processor with multiple cores (e.g., a multi-core processor), multiple processors with a single core, multiple processors with multiples cores, or any combination thereof.

The memory 904 includes a main memory 912, a static memory 914, and a storage unit 916, both accessible to the processors 902 via the bus 944. The main memory 904, the static memory 914, and storage unit 916 store the instructions 908 embodying any one or more of the methodologies or functions described herein. The instructions 908 may also reside, completely or partially, within the main memory 912, within the static memory 914, within machine-readable medium 918 (e.g., a non-transitory machine-readable storage medium) within the storage unit 916, within at least one of the processors 902 (e.g., within the processor's cache memory), or any suitable combination thereof, during execution thereof by the machine 900.

Furthermore, the machine-readable medium 918 is non-transitory (in other words, not having any transitory signals) in that it does not embody a propagating signal. However, labeling the machine-readable medium 918 "non-transitory" should not be construed to mean that the medium is incapable of movement; the medium should be considered as being transportable from one physical location to another. Additionally, since the machine-readable medium 918 is tangible, the medium may be a machine-readable device.

The I/O components 942 may include a wide variety of components to receive input, provide output, produce output, transmit information, exchange information, capture measurements, and so on. The specific I/O components 942 that are included in a particular machine will depend on the type of machine. For example, portable machines such as mobile phones may include a touch input device or other such input mechanisms, while a headless server machine will likely not include such a touch input device. It will be appreciated that the I/O components 942 may include many other components that are not shown in FIG. 9. In various examples, the I/O components 942 may include output components 928 and input components 930. The output components 928 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 930 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location, force of touches or touch gestures, or other tactile input components), audio input components (e.g., a microphone), and the like.

In further examples, the I/O components 942 may include biometric components 932, motion components 934, environmental components 936, or position components 938, among a wide array of other components. For example, the biometric components 932 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 934 include acceleration sensor components (e.g., accelerometer), gravitation sensor components, rotation sensor components (e.g., gyroscope), and so forth. The environmental components 936 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 938 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 942 further include communication components 940 operable to couple the machine 900 to a network 920 or devices 922 via a coupling 924 and a coupling 926, respectively. For example, the communication components 940 may include a network interface component or another suitable device to interface with the network 920. In further examples, the communication components 940 may include wired communication components, wireless communication components, cellular communication components, Near Field Communication (NFC) components, Bluetooth® components (e.g., Bluetooth® Low Energy), WiFi® components, and other communication components to provide communication via other modalities. The devices 922 may be another machine or any of a wide variety of peripheral devices (e.g., a peripheral device coupled via a USB).

Moreover, the communication components 940 may detect identifiers or include components operable to detect identifiers. For example, the communication components 940 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 940, such as location via Internet Protocol (IP) geolocation, location via Wi-Fi® signal triangulation, location via detecting an NFC beacon signal that may indicate a particular location, and so forth.

The various memories (e.g., memory 904, main memory 912, static memory 914, memory of the processors 902), storage unit 916 may store one or more sets of instructions and data structures (e.g., software) embodying or used by any one or more of the methodologies or functions described herein. These instructions (e.g., the instructions 908), when executed by processors 902, cause various operations to implement the disclosed examples.

The instructions 908 may be transmitted or received over the network 920, using a transmission medium, via a network interface device (e.g., a network interface component included in the communication components 940) and using any one of a number of well-known transfer protocols (e.g., hypertext transfer protocol (HTTP)). Similarly, the instructions 908 may be transmitted or received using a transmission medium via the coupling 926 (e.g., a peer-to-peer coupling) to the devices 922.

Figure 10:
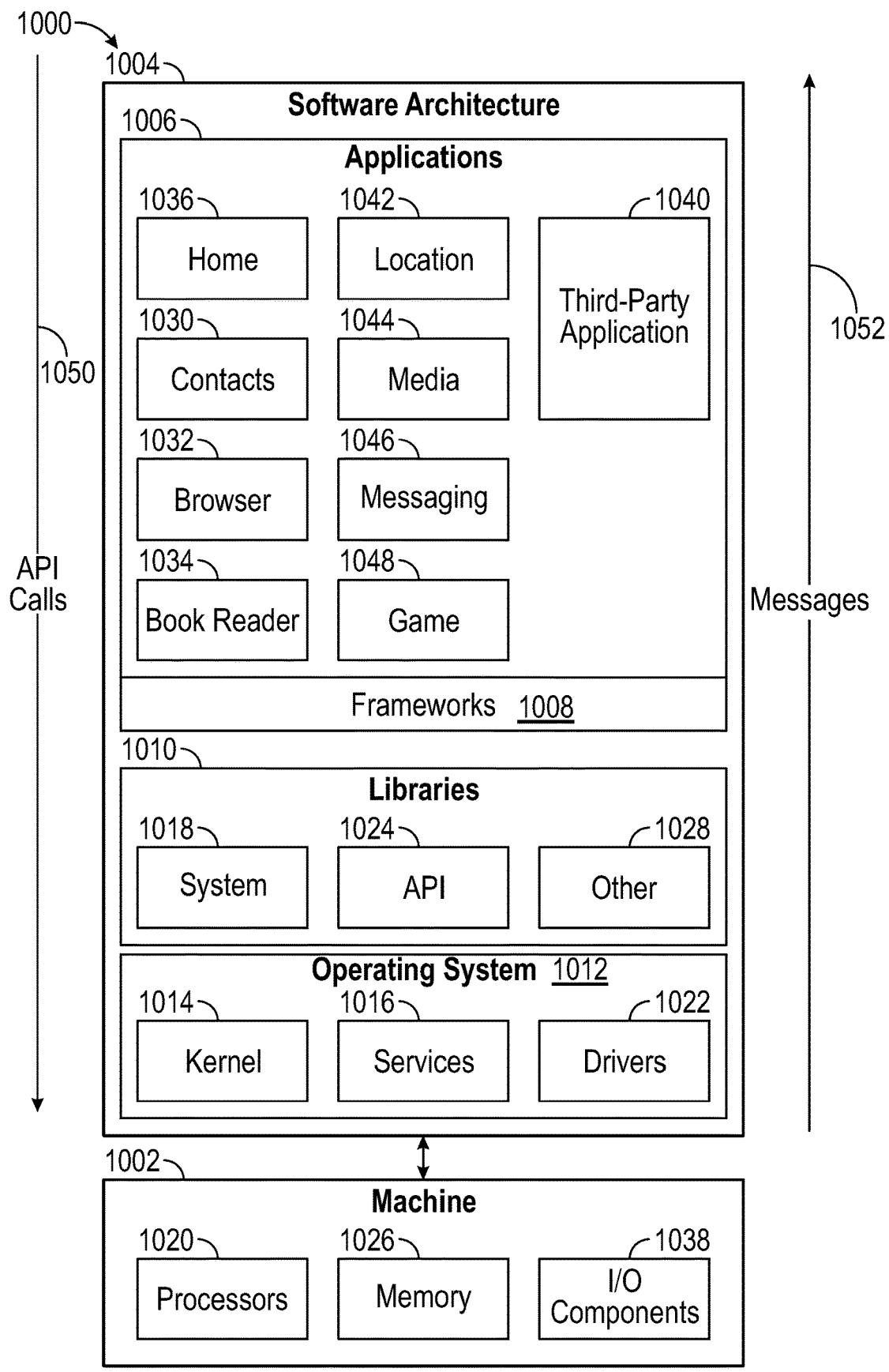
FIG. 10 is block diagram showing a software architecture within which aspects of the present disclosure may be implemented, in accordance with some examples.

FIG. 10 is a block diagram 1000 illustrating a software architecture 1004, which can be installed on any one or more of the devices described herein. The software architecture 1004 is supported by hardware such as a machine 1002 that includes processors 1020, memory 1026, and I/O components 1038. In this example, the software architecture 1004 can be conceptualized as a stack of layers, where each layer provides a particular functionality. The software architecture 1004 includes layers such as an operating system 1012, libraries 1010, frameworks 1008, and applications 1006. Operationally, the applications 1006 invoke API calls 1050 through the software stack and receive messages 1052 in response to the API calls 1050.

The operating system 1012 manages hardware resources and provides common services. The operating system 1012 includes, for example, a kernel 1014, services 1016, and drivers 1022. The kernel 1014 acts as an abstraction layer between the hardware and the other software layers. For example, the kernel 1014 provides memory management, processor management (e.g., scheduling), component management, networking, and security settings, among other functionality. The services 1016 can provide other common services for the other software layers. The drivers 1022 are responsible for controlling or interfacing with the underlying hardware. For instance, the drivers 1022 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

The libraries 1010 provide a low-level common infrastructure used by the applications 1006. The libraries 1010 can include system libraries 1018 (e.g., C standard library) that provide functions such as memory allocation functions, string manipulation functions, mathematic functions, and the like. In addition, the libraries 1010 can include API libraries 1024 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1010 can also include a wide variety of other libraries 1028 to provide many other APIs to the applications 1006.

The frameworks 1008 provide a high-level common infrastructure that is used by the applications 1006. For example, the frameworks 1008 provide various graphical user interface (GUI) functions, high-level resource management, and high-level location services. The frameworks 1008 can provide a broad spectrum of other APIs that can be used by the applications 1006, some of which may be specific to a particular operating system or platform.

In an example, the applications 1006 may include a home application 1036, a contacts application 1030, a browser application 1032, a book reader application 1034, a location application 1042, a media application 1044, a messaging application 1046, a game application 1048, and a broad assortment of other applications such as a third-party application 1040. The applications 1006 are programs that execute functions defined in the programs. Various programming languages can be employed to create one or more of the applications 1006, structured in a variety of manners, such as object-oriented programming languages (e.g., Objective-C, Java, or C++) or procedural programming languages (e.g., C or assembly language). In a specific example, the third-party application 1040 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1040 can invoke the API calls 1050 provided by the operating system 1012 to facilitate functionality described herein.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like, whether or not qualified by a term of degree (e.g. approximate, substantially or about), may vary by as much as ±10% from the recited amount.

The examples illustrated herein are described in sufficient detail to enable those skilled in the art to practice the teachings disclosed. Other examples may be used and derived therefrom, such that structural and logical substitutions and changes may be made without departing from the scope of this disclosure. The Detailed Description, therefore, is not to be taken in a limiting sense, and the scope of various examples is defined only by the appended claims, along with the full range of equivalents to which such claims are entitled.

What is claimed is:

1. A method for categorizing mobile devices, the method comprising:
    distributing, by a server system, benchmark applications to a plurality of client mobile devices, the benchmark applications configured to at least one of produce or collect one or more dynamic and static parameters as performance metrics for each client mobile device;
    receiving, by the server system, the performance metrics of the plurality of client mobile devices;
    comparing, by the server system, the performance metrics of a client mobile device having an unknown mobile device type to the performance metrics of client mobile devices having known mobile device types;
    categorizing, by the server system, the client mobile device having the unknown mobile device type with one or more client mobile devices having known mobile device types according to similarity of the performance metrics of the client mobile device having the unknown mobile device type to the performance metrics of the one or more of the client mobile devices having known mobile device types, wherein at least one of a central processing unit or graphics processing unit of the client mobile device having the unknown mobile device type is different than for the one or more of the client mobile devices having the known mobile device types;
    identifying, by the server system, feature levels for at least one feature of a social media application on the categorized client mobile device having the unknown mobile device type; and
    distributing, by the server system, the identified feature levels for the at least one feature of the social media application to the categorized client mobile device having the unknown mobile device type for use by the categorized client mobile device to configure at least one feature of the social media application on the categorized client mobile device having the unknown mobile device type in accordance with the identified feature levels for the at least one feature of the social media application on the categorized client mobile device having the unknown mobile device type for more efficient processing of the social media application at the identified feature levels on the categorized client mobile device having the unknown mobile device type.

2. The method of claim 1, wherein the comparing comprises:
    generating a signature from the performance metrics of the client mobile device having the unknown mobile device type; and
    comparing the signature to signatures of client mobile devices having known mobile device types;
    wherein the categorizing categorizes the client mobile device having the unknown mobile device type responsive to comparing the signatures.

3. The method of claim 2, wherein the signature is a multi-dimensional signature and the comparing identifies a closest match in a multi-dimensional space.

4. The method of claim 2, wherein the comparing the signature to the signatures comprises applying a fuzzy matching algorithm.

5. The method of claim 1, wherein the categorizing comprises:
    assigning the client mobile device having the unknown mobile device type into one of a plurality of categories, each category associated with one or more features and each feature having a feature level selected from a plurality of feature levels.

6. The method of claim 1, wherein each of the benchmark applications has a specified time for completion.

7. The method of claim 6, wherein one of the benchmark applications is selected from a group comprising determining how many primes are calculated within a first predetermined period of time and determining how many images are compared from an image set within a second predetermined period of time.

8. The method of claim 1, wherein the method further comprises:
    identifying that the client mobile device of the unknown mobile device type has one or more missing performance metrics;
    requesting that the client mobile device of the unknown mobile device type perform the benchmark applications corresponding the one or more missing performance metrics; and
    receiving the one or more missing performance metrics.

9. A system for categorizing mobile devices, the system comprising:
    a memory that stores instructions; and
    a processor configured by the instructions to perform operations comprising:
        distributing benchmark applications to a plurality of client mobile devices, the benchmark applications configured to at least one of produce or collect one or more dynamic and static parameters as performance metrics for each client mobile device;
        receiving the performance metrics from the plurality of client mobile devices;
        detecting a client mobile device having an unknown mobile device type;
        comparing the performance metrics of the client mobile device having the unknown mobile device type to the performance metrics of client mobile devices having known mobile device types;
        categorizing the client mobile device having the unknown mobile device type with one or more client mobile devices having known mobile device types according to similarity of the performance metrics of the client mobile device having the unknown mobile device type to the performance metrics of the one or more of the client mobile devices having known mobile device types, wherein at least one of a central processing unit or graphics processing unit of the client mobile device having the unknown mobile device type is different than for the one or more of the client mobile devices having the known mobile device types;
        identifying feature levels for at least one feature of a social media application on the categorized client mobile device having the unknown mobile device type; and
        distributing the identified feature levels for the at least one feature of the social media application to the categorized client mobile device having the unknown mobile device type for use by the categorized client mobile device to configure at least one feature of the social media application on the categorized client mobile device having the unknown mobile device type in accordance with the identified feature levels for the at least one feature of the social media application on the categorized client mobile device having the unknown mobile device type for more efficient processing of the social media application at the identified feature levels on the categorized client mobile device having the unknown mobile device type.

10. The system of claim 9, wherein the comparing comprises:
generating a signature from the performance metrics of the client mobile device having the unknown mobile device type; and
comparing the signature to signatures of client mobile devices having known mobile device types;
wherein the categorizing categorizes the client mobile device having the unknown mobile device type responsive to comparing the signatures.

11. The system of claim 10, wherein the signature is a multi-dimensional signature and the comparing identifies a closest match in a multi-dimensional space.

12. The system of claim 10, wherein the comparing the signature to the signatures comprises applying a fuzzy matching algorithm.

13. The system of claim 9, wherein the categorizing comprises:
assigning the client mobile device having the unknown mobile device type into one of a plurality of categories, each category associated with one or more features and each feature having a feature level selected from a plurality of feature levels.

14. The system of claim 9, wherein each of the benchmark applications has a specified time for completion.

15. The system of claim 14, wherein one of the benchmark applications is selected from a group comprising determining how many primes are calculated within a first predetermined period of time and determining how many images are compared from an image set within a second predetermined period of time.

16. The system of claim 9, wherein the system further comprises:
identifying that the client mobile device of the unknown mobile device type has one or more missing performance metrics;
requesting that the client mobile device of the unknown mobile device type perform the benchmark applications corresponding the one or more missing performance metrics; and
receiving the one or more missing performance metrics.

17. A non-transitory processor-readable storage medium storing processor-executable instructions that, when executed by a processor of a machine, cause the machine to perform operations comprising:
distributing benchmark applications to a plurality of client mobile devices, the benchmark applications configured to at least one of produce or collect one or more dynamic and static parameters as performance metrics for each client mobile device;
receiving the performance metrics from the plurality of client mobile devices;
comparing the performance metrics for a client mobile device having an unknown mobile device type to the performance metrics of client mobile devices having known mobile device types;
categorizing the client mobile device having the unknown mobile device type with one or more client mobile devices having known mobile device types according to similarity of the performance metrics for the client mobile device having the unknown mobile device type to the performance metrics of the one or more of the client mobile devices having known mobile device types, wherein at least one of a central processing unit or graphics processing unit of the client mobile device of the unknown mobile device type is different than for the one or more of the client mobile devices having the known mobile device types;
identifying feature levels for at least one feature of a social media application on the categorized client mobile device having the unknown mobile device type; and
distributing the identified feature levels for the at least one feature of the social media application to the categorized client mobile device having the unknown mobile device type for use by the categorized client mobile device to configure at least one feature of the social media application on the categorized client mobile device having the unknown mobile device type in accordance with the identified feature levels for the at least one feature of the social media application on the categorized client mobile device having the unknown mobile device type for more efficient processing of the social media application at the identified feature levels on the categorized client mobile device having the unknown mobile device type.

18. The non-transitory processor-readable storage medium of claim 17, wherein the instructions causing the machine to compare the performance metrics comprises:
generating a signature from the performance metrics for the client mobile device having the unknown mobile device type; and
comparing the signature to signatures of client mobile devices having known mobile device types;
wherein the categorizing categorizes the client mobile device having the unknown mobile device type responsive to comparing the signatures.

* * * * *